United States Patent [19]

Dupouy et al.

[11] Patent Number: 5,782,579
[45] Date of Patent: Jul. 21, 1998

[54] PIPE SYSTEM FOR SUPPLYING LIQUID FUEL TO AN UNDERGROUND TANK AND FOR TRANSFER OF SUCH FUEL TO A DISPENSING STATION

[75] Inventors: Jean-Claude Dupouy, Arthon-en-Retz; Yannick Lallinec, Quimper; Daniel Mahin, Savonnieres, all of France

[73] Assignee: Total Raffinage Distribution, S.A., Puteaux, France

[21] Appl. No.: 662,362

[22] Filed: Jun. 12, 1996

[30] Foreign Application Priority Data

Jun. 12, 1995 [FR] France ................... 95 06898

[51] Int. Cl.$^6$ ............................................. F16L 1/00
[52] U.S. Cl. ................... 405/52; 138/114; 141/86; 405/154
[58] Field of Search ................... 405/154, 156, 405/157, 128, 52; 285/133.1; 141/86, 88, 89; 138/114, 108, 110, 111, 112, 113

[56] References Cited

U.S. PATENT DOCUMENTS

| 4,871,084 | 10/1989 | Robbins | 137/363 |
| 4,971,477 | 11/1990 | Webb et al. | 405/154 |
| 5,054,523 | 10/1991 | Rink | 137/377 |
| 5,135,324 | 8/1992 | Bravo | 405/52 |
| 5,257,652 | 11/1993 | Lawrence | 405/128 X |
| 5,427,474 | 6/1995 | Silvers | 405/128 X |
| 5,580,186 | 12/1996 | Tassone et al. | 405/154 |
| 5,590,981 | 1/1997 | Osborne | 405/154 |

FOREIGN PATENT DOCUMENTS

| 4109572 A1 | 10/1991 | Germany. |
| WO 90/07674 | 7/1990 | WIPO. |

Primary Examiner—Dennis L. Taylor
Attorney, Agent, or Firm—Frommer Lawrence & Haug LLP; A. Thomas S. Safford

[57] ABSTRACT

A pipe system for supplying liquid fuel to a underground tank from a supply station and for transfer of said fuel from said tank to at least one dispensing station, said system comprising an assembly of flexible inner piping through which the fuel flows and an assembly of flexible outer piping enveloping the inner piping. The assembly of outer piping is continuous and envelops the inner piping along its entire length without interruption between the supply station and the underground tank and/or between said tank and the dispensing station and advantageously with the inner piping centered within the outer piping by means of concentric spacers perforated to allow gasoline leaking thereinto to flow therepast along the thus formed annular spacing, and preferably also with a branch bypass pipe to interconnect the annular spacing of the outlet conduit with the annular spacing of the inlet conduit to allow collection of gasoline leaking into such spacings into a common gravity fed cup.

14 Claims, 5 Drawing Sheets

PIPE SYSTEM FOR SUPPLYING LIQUID FUEL TO AN UNDERGROUND TANK AND FOR TRANSFER OF SUCH FUEL TO A DISPENSING STATION

BACKGROUND OF THE INVENTION

1. Field of the Invention

The present invention relates to a pipe system for supplying liquid fuel from a supply station to an underground tank and for transfer of said fuel to a dispensing station.

2. Description of Related Art

It is known that in gasoline service stations the fuel dispensed to automobile drivers from dispensing stations known as gasoline pumps is stored in underground storage tanks which must meet very strict safety requirements. These tanks are supplied with fuel from an above-ground supply station by means of tank trucks with the aid of a first pipe known as the product supply line. At the supply station is simply disposed, most of the time, the free end of said first pipe (for connecting to the flexible discharge pipe of the tank truck).

Additionally, the storage tank is connected to the dispensing stations by second pipes known as suction pipes.

In general, fairly long sections, for example from 20 to 100 meters long, of the first and the second connection pipes are buried and consist of metallic pipes or more rarely pipes of rigid polyethylene. More recently, in order to protect the environment from possible fuel leakage, it has been proposed to use double pipes comprising a flexible inner pipe through which the fuel flows and an outer, relatively rigid pipe disposed coaxially with the inner pipe.

To be able to collect any fuel leakages and to replace sections of the flexible inner pipe using that type of system, one or more tight access chambers, accessible from the outside through manholes, must be provided along the course of the double pipe with a system for recovering fuel leakages at this location. The outer pipe is interrupted at the sidewalls of the access chamber, and only two sections of the inner pipe, disposed end-to-end with respect to each other and connected to each other, pass through the access chamber and are thus accessible to workers (see, for example, U.S. Pat. No. 4,971,477).

Such access chambers, however, require expensive excavation and brickwork. Moreover, they interfere with the natural underground flow of rainwater in the area of the service station involved.

OBJECT OF THE INVENTION

The purpose of the present invention is to eliminate these drawbacks by providing a pipe system that obviates the need for tight access chambers and manholes by use of a double pipe along the entire route travelled by the fuel from the supply station to the underground tank as well as from said tank to the dispensing station(s).

SUMMARY OF THE INVENTION

To this end the invention has as a preferred embodiment a pipe system for supplying liquid fuel from a supply station to an underground tank, and for transfer of said fuel to at least one dispensing station, said system comprising an assembly of flexible inner pipes through which the fuel flows, and an assembly of flexible outer pipes enveloping the inner pipes, said pipe system being characterized by the fact that the assembly of outer piping is continuous and along its entire length envelopes the inner piping without interruption from the fuel supply station to the underground tank and/or from said tank to the dispensing station.

To be able to obtain access to the inner piping for the purpose of recovering any fuel leakage, doing maintenance work and replacing some sections of said inner piping, the inner piping advantageously contains sections of flexible pipe connected to each other and/or to the supply station, the underground tank, the dispensing station or any intermediate connection elements by flexible, fuel-tight connectors (for example, corrugated bellows) that can be separated from adjacent elements to provide access to the inner piping.

The sections of outer piping can be connected to associated flexible pieces by engaging the ends of said sections with the adjacent pieces and connecting them firmly by means of external compression bands of the usual type.

Preferably, the sections of the outer pipe have a corrugated profile to enable gaskets to be interposed in the corrugations between the bellows and the ends of the flexible sections engaged within said bellows.

The outer pipe extending between the dispensing station and the underground tank is advantageously provided with a tubular connector at the inlet pipe of said tank, said connector comprising a branch pipe for detecting and recovering any fuel leakage from the inner pipe.

The outer pipe extending between the supply station and the underground tank is advantageously provided at the inlet pipe of said underground tank with a coaxial, rigid cup comprising a cylindrical part which is covered by the adjacent end of the associated section of outer pipe so that this section of outer pipe can be firmly connected to said cylindrical portion of the cup by means of a simple, conventional compression band. The coaxial cup also comprises a branch pipe for detecting and recovering any fuel leakage from the inner pipe.

Because of the presence of two substantially concentric pipes extending along the entire path travelled by the fuel, the pipe system according to the invention thus has the advantage of ensuring complete environmental protection without it being necessary to use tight, costly and impractical access chambers. This system according to the present invention is readily installed and, because flexible connectors are used between sections of the outer piping, allows for easy detection and recovery of any fuel that may have leaked out of the inner piping. The present invention also allows for maintenance and replacement of said inner piping.

The inner pipe may consist of a multilayer composite of a known type, with an external layer of synthetic rubber and one or more internal layers of which at least one is totally impermeable to the conveyed liquid fuel. A pipe of this type is described, for example, in French Patent Application No. 94 01447 of Feb. 9, 1994.

The outer pipe generally consists of a thermoplastic material, for example polyethylene, or some other appropriate material resistant to the fuel, to humidity and to cryptogenic agents.

BRIEF DESCRIPTION OF THE DRAWINGS

In this specification and in the accompanying drawings, we have shown and described preferred embodiments of our invention and have suggested various alternatives and modifications thereof; but it is to be understood that these are not intended to be exhaustive and that many other changes and modifications can be made within the scope of the invention. The suggestions herein are selected and included for purposes of illustration in order that others skilled in the art will more fully understand the invention and the principles thereof and will thus be enabled to modify it in a variety of forms, each as may be best suited to the conditions of a particular use.

DESCRIPTION OF PREFERRED EMBODIMENTS

Figure 1:
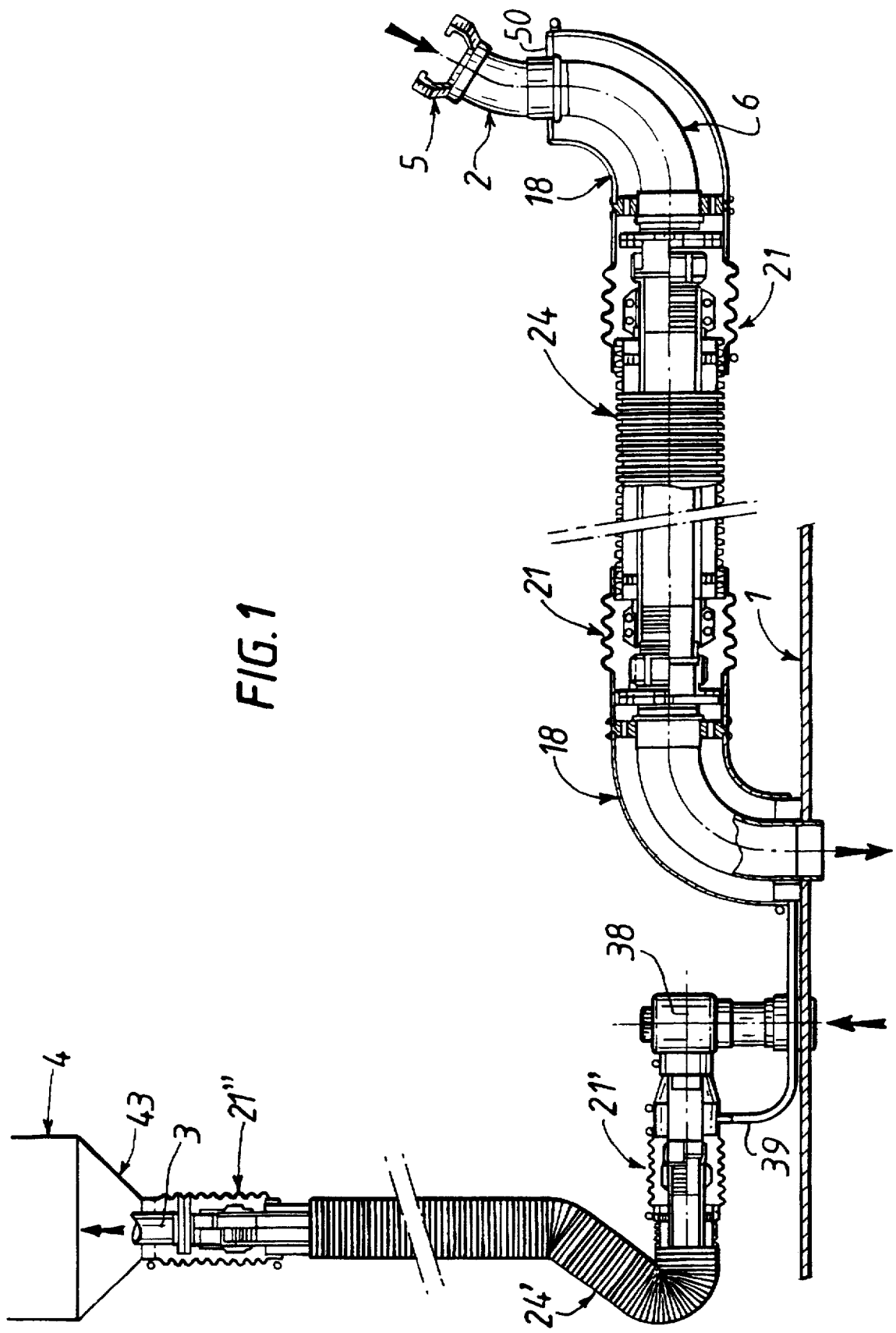
FIG. 1 is a partially cross sectioned schematic general overview of an assembly for supplying fuel to an underground tank and for transferring said fuel to a dispensing apparatus by use of a pipe system according to the illustrated preferred embodiment of the present invention.

Referring initially to the general view of FIG. 1, this shows an underground tank 1 which is periodically filled with fuel, usually by gravity, from tank trucks by use of a filling coupling 2 disposed above ground at a predetermined supply station for the purpose of transferring the stored fuel to supply conduit 3 of a gasoline pump 4 by aspiration or pressure (pumps not shown).

Tank 1 and coupling 2, on the one hand, and tank 1 and conduit 3, on the other, are connected respectively by an inner, fuel-conveying pipe consisting of various elements tightly connected to each other and which will be described in greater detail hereinbelow, each inner pipe being protected externally, along its entire length, by an outer pipe also consisting of various elements tightly connected to each other, which also will be described in detail hereinbelow, but which, according to one of the essential features of the invention is not interrupted between the fuel supply station and tank 1 and between said tank and the fuel dispensing station.

Filling coupling 2 is a conduit provided at its free end with connecting collar 5. According to FIG. 2, said coupling 2 is connected to an inner curved tubular part 6 shaped like an elbow which at its other end is provided with a mating flange 7 attached by means of bolts and nuts (not shown) to a companion flange 8 which comprises a first straight tubular part 9. Flange 7 can be detached from mating flange 8 for maintenance or for replacement of the flexible inner pipe 12. To first straight tubular part 9 is attached a female part 10 extended by a second straight tubular part 11 which fits into flexible inner pipe 12. Two half-shells 13, assembled by means of screws, hold together the second straight tubular part 11 and inner pipe 12 in absolutely tight fashion.

A collar 50 is fixed coaxially to the end of coupling 2 to ensure total fuel tightness. On said coupling 2 (through the collar 50) is fixed, with the aid of compression band 17, a first tubular part 18 of a flexible outer pipe, which part 18 is coaxial with inner curved tubular part 6. The downstream end of said first outer tubular part 18, in the direction of fuel flow, is fixed by means of second compression band 19 to a perforated connector 20 provided with holes 26. Said first part 18 is extended by corrugated bellows 21. Said bellows is capable of being bent back onto itself. Its upstream end is fixed to said perforated connector 20 by third compression band 22, and its downstream end is fixed to outer pipe 24 by third compression band 23. Outer pipe 24 is coaxial with inner pipe 12 (with interposition, at least between the downstream and the upstream ends of said pipes, of a collar 25 perforated by holes 26' and which, like connector 20, centers the pipes relative to each other while allowing any fuel leakage to pass).

Outer pipe 24 has a corrugated outer profile, sealing O-rings 27 being lodged in the outer corrugations below the corresponding end of bellows 21, so as to be compressed by it (by action of the compression ring 23).

Figure 3:
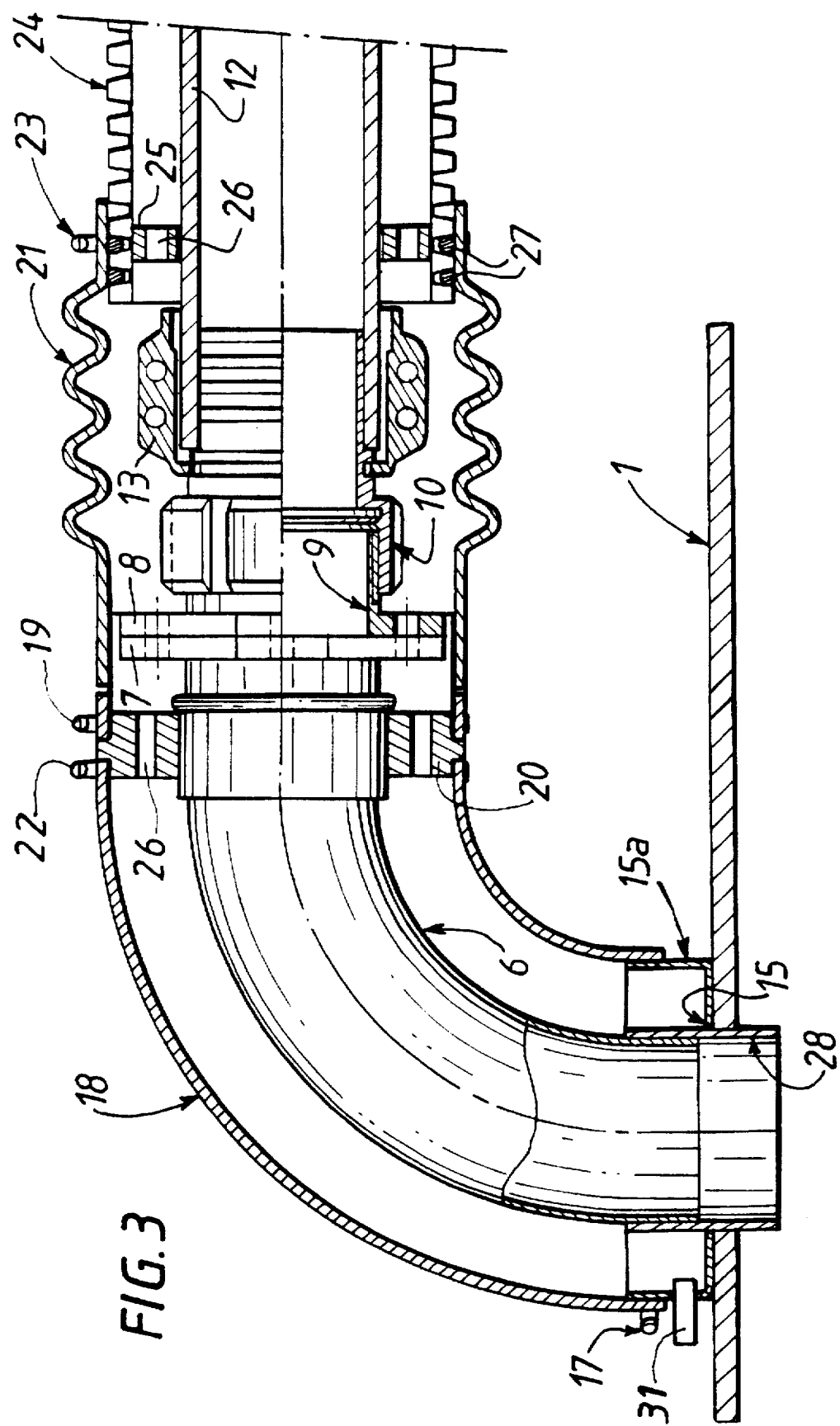
FIG. 3 is an enlarged and more detailed view of another segment of the system illustrated in FIG. 1 showing the downstream portion of the product supply line connected to the underground storage tank.
Figure 4:
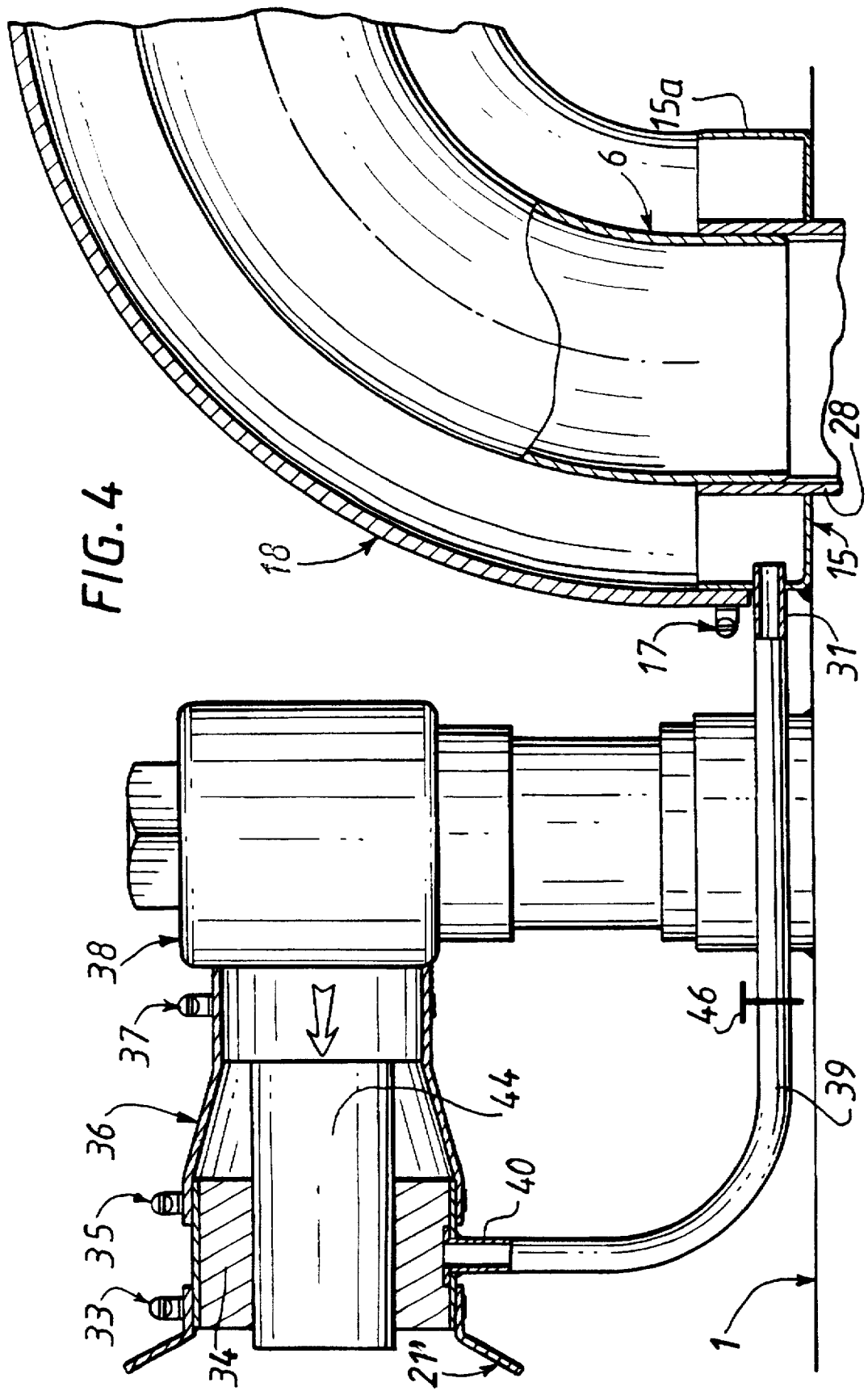
FIG. 4 is an enlarged and more detailed view of still other segments of the system illustrated in FIG. 1 showing the means for detecting and recovering leaked product at the end of the outer and inner pipes connected to the underground tank.

At the downstream end of pipes 12 and 24 is located a system for attachment to underground tank 1. Said system is represented in detail in FIG. 3 where the elements already described are indicated by the same reference numerals. Here, the downstream end of a second inner curved tubular part 6 is connected to a section of pipe 28 which penetrates into tank 1.

Disposed coaxially with pipe 28 is a cup 15 provided with a branch pipe 31 whose function will become apparent hereinbelow. Cylindrical part 15a of said cup is engaged by the downstream end of the second outer bent tubular part 18 of the outer pipe and is firmly connected to it by means of second compression band 17.

Note that pipes 12 and 24 have been described as being a single pipe, but they can, of course, consist of several sections of conduits connected to each other by any means known in the art, including those described herein for connecting the ends of pipes and the inlet conduits of the dispensing and supply stations.

To recover any fuel leakage, to verify the tightness of the inner pipe and/or possibly to replace inner pipe 12, it suffices to disconnect one and/or the other bellows 21 of outer pipe 24 to gain access to inner pipe 12. Thus it is no longer necessary, as in the prior art, to make use of trenches or underground access chambers separating the different sections and separated from the outer piping.

Downstream of tank 1, between said tank and the dispensing station, is located a system of inner and outer pipes similar to the one just described for filling tank 1. The same reference numerals as before are used to indicate similar elements. Note that in this case the inner pipe comprises two bellows 21' and 21" and a section of outer pipe 24'. Bellows 21' is connected by means of compression band 33 to tubular connector 34 (which is provided with branch pipe 40) and to which flexible sleeve 36 is fixed by means of compression band 35. Said sleeve 36 is connected to fuel discharge head 38 of tank 1 by band 37. The tubular connector 34 surrounds tubular end 44 of head 38, the latter being attached to tank 1 and being provided with a check valve. As an alternative, the check valve can be located at the dispensing station.

Figure 2:
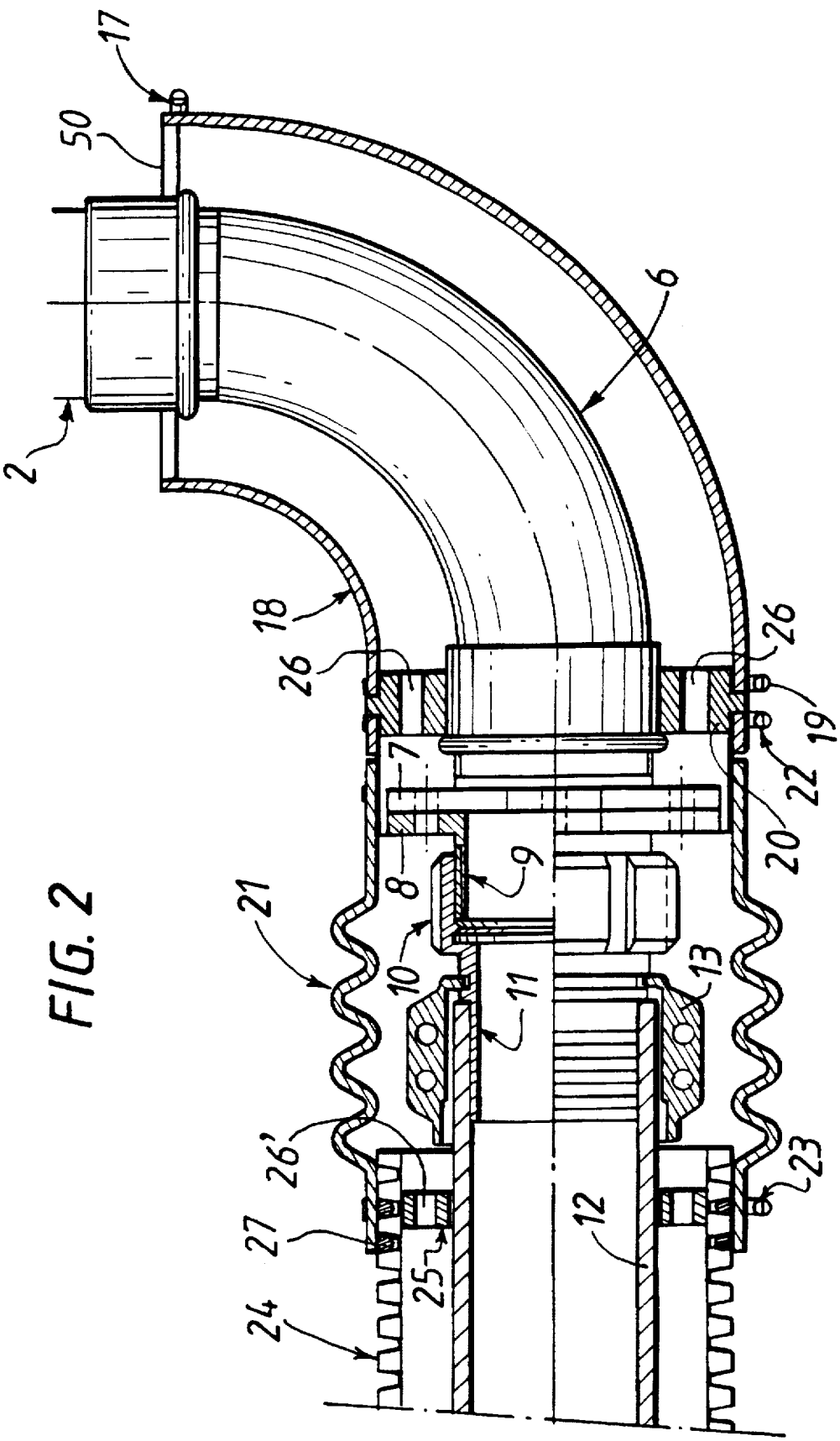
FIG. 2 is an enlarged and more detailed view of a segment of the system illustrated in FIG. 1 showing the upstream portion of the underground tank product supply line which is adjacent to the fuel supply station for receipt of product from a delivery tank truck.

A tube (not shown) dipping into the fuel in tank 1 emerges from head 38 as tubular end 44 and, as shown in FIG. 1, is connected to inner pipe 12 (in the manner previously described for similar structure in FIG. 2).

Branch pipe 40 is connected to hose 39 which along its length is equipped with stopcock 46 to allow for easy detection and recovery of any fuel leakage.

Figure 5:
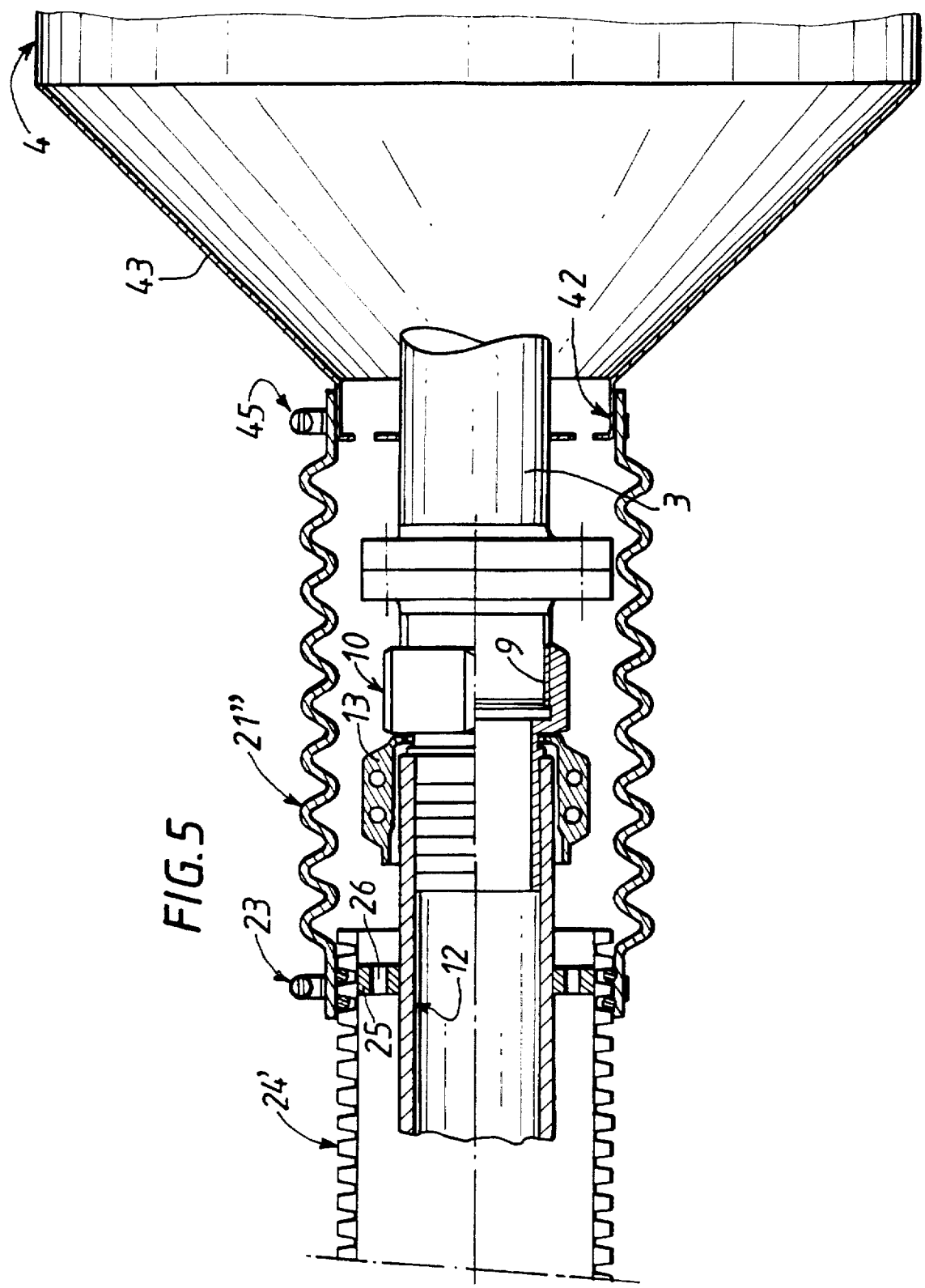
FIG. 5 is an enlarged and more detailed view of yet another segment of the system illustrated in FIG. 1 showing the downstream piping for potential removal and recovery of the product at the gasoline pump.

Referring to FIG. 5, it can be seen that cup 43 to which bellows 21" is attached by means of compression band 45 has a perforated base 42. Said cup 43 has a flared shape and is located below the gasoline pump to recover any fuel that may leak from said pump.

The invention thus provides a system of environmental protection which is particularly effective when used in fuel installations, is easy to install, and is less costly compared to the usual infrastructures.

What is claimed is:

1. A pipe system for filling an underground tank with liquid fuel from a supply ground level station and for transferring liquid fuel between an underground tank and at least one dispensing ground level station through which fuel is delivered, said system comprising:

flexible inner piping, flexible outer piping, at least one coaxial assembly of said inner and outer piping extending between said tank and said dispensing ground level station and one coaxial assembly of said inner and outer piping extending between said tank and said supply station, with said outer piping of each assembly being continuous and protectively enveloping the inner piping of the respective assembly along its entire length without interruption from adjacent said tank to adjacent said respective ground level station with the annular spacing between said inner and outer piping being sufficient for said inner piping to be removable from said outer piping and for any fuel escaping from the inner piping to be retained within and flow along said outer piping, a rigid annular cup located at said tank at the downstream end of and coaxial with the inner piping and defining the downstream end of the respective annular spacing which extends between said tank and said supply station, and a branch piping which is in communication, through the outer piping interconnecting the underground tank with the dispensing station, with the upstream end of such outer piping and further communicates with said cup, with said branch pipe being disposed so that any fuel leaking from the corresponding inner pipe is removed to said cup by gravity.

2. The pipe system according to claim 1, wherein said outer flexible piping is comprised of a plurality of sections joined seriatim to each other in a continuous line which is ultimately joined between said tank and a respective ground level station in a manner including on at least one section at least one intermediate connecting element in the form of a flexible fuel-tight connector capable of being separated from the at least one section and to be flexed to provide access to the flexible inner piping therein.

3. The pipe system according to claim 1, wherein said outer piping further comprises flexible outer piping sections and flexible, fuel-tight connectors, wherein said sections of flexible outer piping are connected at either end to a pair of one or more components selected from the group consisting of other sections of flexible piping, said supply station, said underground tank, said dispensing station and intermediate connecting elements, wherein said components are connected by said flexible, fuel-tight connectors, and wherein said connectors are capable of being separated from adjacent elements and bent to provide access to the flexible inner piping therewithin.

4. The pipe system of claim 2, wherein at least one of said connectors comprise a corrugated bellows.

5. The pipe system of claim 3, wherein at least one of said connectors comprise a corrugated bellows.

6. The pipe system of claim 4, wherein flexible sections of said outer piping assembly are fitted overlapping respective adjacent ends of said bellows and are firmly attached to said bellows by a system of compression bands.

7. The pipe system of claim 6, further comprising sealing O-rings, wherein the flexible sections of said outer piping have corrugations in planes substantially perpendicular to their axes, said sealing O-rings are fitted into the corrugations at the respective overlapping end of said outer flexible sections, and said sealing O-rings are interposed between an end of a flexible section and a respective overlapping end of said adjacent bellows.

8. The pipe system of claim 5, further comprising the downstream end of said inner piping from said supply station extending directly into said tank and being coaxial within said rigid cup wherein the outer piping extending from said supply station to said underground tank is attached by its adjacent end to the outer cylindrical part of said cup by a compression band.

9. The pipe system of claim 1, wherein said branch piping further comprises a hose with a stopcock.

10. The pipe system of claim 9, wherein said branch piping further comprises a hose with a stopcock.

11. The pipe system of claim 1, further comprising a flared cup, wherein that portion of said outer piping connecting said underground tank with said dispensing station, which is adjacent said dispensing station, being connected to the flared cup positioned thereunder, whereby fuel leakages are collected in said flared cup and are passed by gravity through holes in the base of said flared cup through said adjacent outer piping and branch piping to said rigid cup.

12. The pipe system of claim 10, further comprising a flared cup, wherein that portion of said outer piping connecting said underground tank with said dispensing station, which is adjacent said dispensing station, is connected to a flared cup positioned thereunder, whereby fuel leakages are collected in said flared cup.

13. A pipe system for filling an underground tank with liquid fuel from a supply station and for transferring said fuel to at least one dispensing station, said system comprising flexible inner piping, flexible outer piping, corrugated bellows, sealing O-rings, an inlet conduit, a rigid cup, a flared cup having holes at its base, a branch pipe, a hose, and a stopcock, said outer piping being continuous and enveloping the inner piping along its entire length without interruption, said outer piping further comprising flexible outer piping sections and flexible, fuel-tight connectors, said sections of flexible outer piping being connected to one or more components selected from the group consisting of other sections of flexible piping, said supply station, said underground tank, said dispensing station and intermediate connecting elements, said components being connected by said flexible, fuel-tight connectors, said connectors being capable of being separated from adjacent elements and bent to provide access to the assembly of flexible inner piping, one or more of said connectors comprising a corrugated bellows, the flexible sections of said outer piping having corrugations in planes substantially perpendicular to their axes, said sealing O-rings being fitted into the corrugations of said flexible sections, and said sealing O-rings being interposed between said flexible sections and said adjacent bellows, flexible sections of said outer piping assembly being fitted into adjacent ends of said bellows and being firmly attached to said bellows by a system of compression bands, said conduit and rigid cup being adjacent said underground tank, said outer piping extending from said supply station to said underground tank, said rigid cup being attached to the adjacent end of said outer piping assembly by a compression band, that portion of said outer pipe connecting said underground tank with said dispensing station, which is adjacent said tank, communicating with said branch pipe, said branch pipe communicating with said hose, said stopcock controling the flow of said hose, and that portion of said outer pipe connecting said underground tank with said dispensing station, which is adjacent said dispensing station, being connected to a flared cup, whereby fuel leakages from said dispensing station are collected in said flared cup and cup are passed by gravity through holes in the base of said flared cup through said adjacent outer piping and branch piping to said rigid cup.

14. The pipe system of claim 1, wherein in at least one coaxial assembly said respective inner and outer piping are coaxially centered relative to each other by at least one collar located between the downstream and the upstream ends of said pipings, said collar being perforated by holes to allow any fuel leakage to pass along the annular spacing therepast.

* * * * *